United States Patent
Merchant et al.

Patent Number: 6,125,207
Date of Patent: *Sep. 26, 2000

[54] ENCODED FACSIMILE COMMUNICATION WITH A SELECTIVE SYSTEM AND METHOD THEREFOR

[75] Inventors: Zaffer S. Merchant, Parkland; Surendra Perera, Boynton Beach, both of Fla.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/465,298

[22] Filed: Jun. 5, 1995

[51] Int. Cl.$^7$ .................................................. G06K 9/36
[52] U.S. Cl. .......................... 382/190; 382/186; 382/187; 358/426
[58] Field of Search .................................... 382/241, 243, 382/190, 186, 187; 358/426, 462

[56] References Cited

U.S. PATENT DOCUMENTS

| | | | |
|---|---|---|---|
| 4,513,444 | 4/1985 | Okai et al. | 382/56 |
| 4,542,412 | 9/1985 | Fuse et al. | 382/243 |
| 4,566,128 | 1/1986 | Araki | 382/56 |
| 4,589,144 | 5/1986 | Namba | 382/61 |
| 4,684,926 | 8/1987 | Yong-Min | 382/243 |
| 4,897,733 | 1/1990 | Sakaguchi et al. | 358/433 |
| 4,920,427 | 4/1990 | Hirata | 358/437 |
| 4,924,521 | 5/1990 | Dinan et al. | 382/54 |
| 5,136,659 | 8/1992 | Kaneko et al. | 382/243 |
| 5,285,506 | 2/1994 | Crooks et al. | 382/13 |

*Primary Examiner*—David K. Moore
*Assistant Examiner*—Stephen Brinich

[57] ABSTRACT

A selective call communication system (10) receives hand written information from a facsimile machine (14) to be delivered to a plurality of selective call receivers (40). The selective call receiver (40) is capable of receiving facsimile information and has a receiver (24) for receiving the handwritten information, a processor (20) for processing the handwritten information. The processor has an image thinner (206) for thinning each line of the handwritten information, a graph model former (208) for forming a graphical model of handwritten information, a graph model reducer (210) for simplifying the graphical model of the handwritten information into a model having a reduced number of segments corresponding to the lines of the handwritten information, and a stroke former (212) for organizing the line segments into as few strokes as possible to recover the handwritten information. A line segment encoder and formatter (214) further encodes the reduced information into relative vectors to further reduce the amount of data. The selective call communication system (10) also has a transmitter (30) for transmitting the handwritten information to at least one selective call receiver (40) capable of receiving facsimile information.

27 Claims, 16 Drawing Sheets

ENCODED FACSIMILE COMMUNICATION WITH A SELECTIVE SYSTEM AND METHOD THEREFOR

FIELD OF THE INVENTION

This invention relates in general to selective call systems, and more particularly to a selective call system capable of facsimile communication.

BACKGROUND OF THE INVENTION

Contemporary selective call receiver communication systems employ messaging schemes that can deliver voice, numeric, or alphanumeric messages to its user. The majority of selective call systems transmit address and message information using a protocol such as GSC (Motorola's Golay Sequential Code), POCSAG (Great Britain's Post Office Code Standardization Advisory Group) or FLEX™. To originate a message or page, a base station (or selective call terminal) is typically accessed via a Public Switch Telephone Network (PSTN) from a telephone.

In the case of transmission of facsimile type messages to selective call receivers, the information is scanned in by facsimile machine, transferred and processed by the selective call system, and then transmitted to a selective call receiver designated by the address. Unfortunately, the transmission of FAX information results in a large amount of information being processed by the selective call messaging (paging) systems, and the data transport protocols do not gracefully allow for the transmission of large amounts of information. As is well known, selective call receivers are powered by limited energy content battery supplies that are quickly degraded when receiving and displaying long messages.

One area of growing concern is the ability to send a handwritten message via a facsimile machine to a wireline device, for example, selective call receivers. While contemporary facsimile communication equipment employ data compression techniques in their coding formats, such data compression techniques are inadequate for adequately preserving the battery life of the selective call receivers. Furthermore, the long data messages indicative of facsimile communication destroy the battery saving schemes currently being employed with selective call communication systems, because the long textual messages require the information to be fragmented and then transmitted to the selective call receivers. This degradation in battery life of the selective call receiver makes facsimile communication unattractive to the users of selective call receivers even though the need exists.

Other areas of growing concern include the fact that as more subscribers use this technology, throughput must be increased and the use of the available frequency spectrum must be maximized. Contemporary data-compression techniques are increasingly inadequate to achieve the necessary throughput and maximization of use of frequency spectrum to accommodate the increasing number of users.

Thus, what is needed is a method and apparatus, in a selective call communication system, for providing facsimile communication of handwritten textual messages to selective call receivers without severely destroying their battery lives. What is also needed is a method and apparatus, in a selective call communication system, for providing such facsimile communication in a manner which maximizes throughput and maximizes use of the available frequency spectrum.

DESCRIPTION OF A PREFERRED EMBODIMENT

Figure 1:
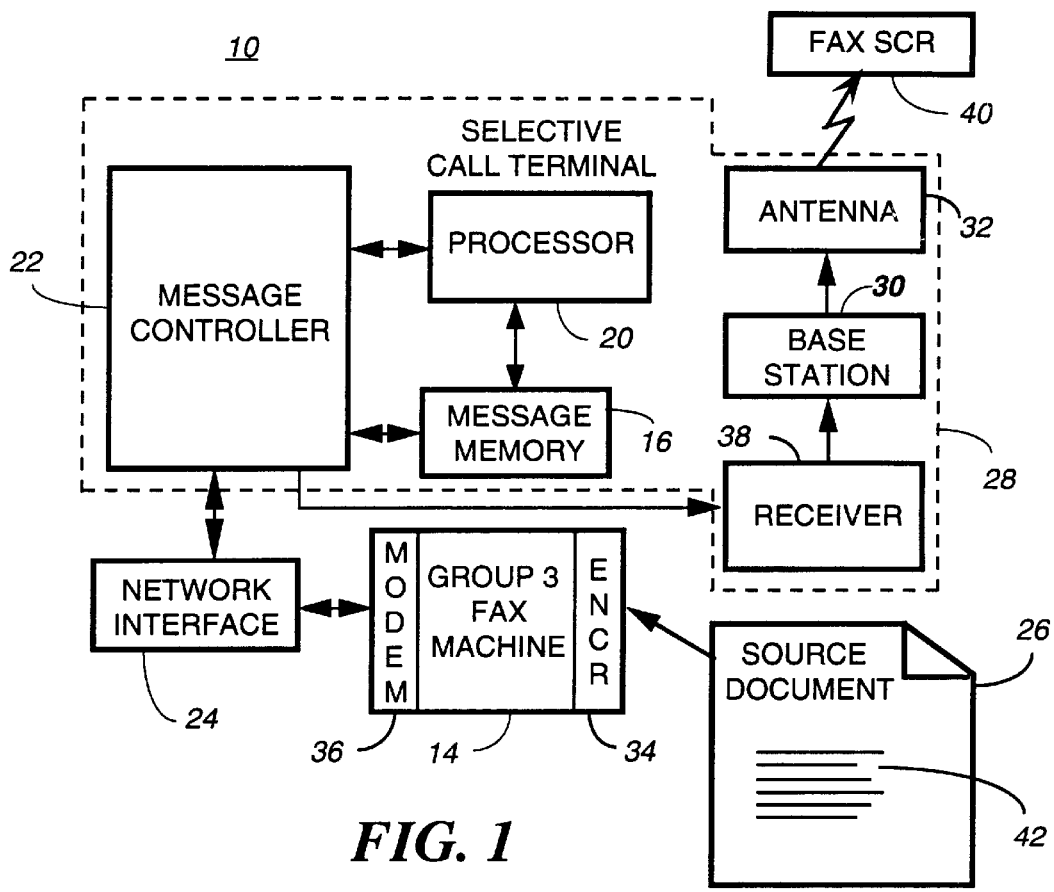
FIG. 1 is an electrical block diagram of a selective call system in accordance with the preferred embodiment of the present invention.

Referring to FIG. 1, an electrical block diagram of a selective call communication system 10 is shown in accordance with the preferred embodiment of the present invention. Operationally, a user enters a source document 26 into a facsimile (FAX) machine (scanner) 14. The FAX machine 14 retrieves (or scans) and quantizes an image (message or information) 42 contained thereon. As is well known to one of ordinary skill in the art, the FAX machine comprises an encoder 34 and a modem 36 for encoding the received information and transmitting the received information from the FAX machine 14. Preferably, the information or message comprises handwritten message or line drawing information 42 to be retrieved from the source document 26.

The FAX machine 14 is coupled to a message controller 22 of a selective call terminal 28 via a network interface 24. The network interface 24, well known to one of ordinary skill in the art, can include a Public Switch Telephone Network (PSTN) or an Integrated Service Digital Network (ISDN). It can also be appreciated by one of ordinary skill in the art that the FAX machine 14 can be directly connected to the message controller 22 via a high-speed network (e.g., RS-232, IEEE 802.3) to achieve an extremely high-speed message throughput. Therefore, the FAX machine 14 needs not be located at the same physical site as the selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the sender, for example, enters the subscriber's cap-code (address) and other system information including handwritten message or line drawing information on the source document 26. The sender can send a FAX by alternatively calling a subscriber's paging service provider using a conventional telephone to enter, for example, the user's cap-code number (a unique number assigned by the paging service provider that corresponds to the actual coded address of the selective call receiver 40) and other system information. The paging service provider maintains a list of FAX capable cap-code numbers (addresses) and upon receiving the entered cap-code number, a procedure to receive a facsimile message is initiated, the details will be discussed below. The user, according to the preferred embodiment of the present invention, enters the address of the selective call receiver 40 to which the FAX is intended and other system information along with, preferably, the handwritten text message or line drawing information. The source document 26 is then scanned into a FAX machine 14. The information is encoded and compressed by the encoder 34 of the FAX machine 14 and transferred by the modem 36 via the network interface 24 to the selective call terminal 28 which will produce a paging FAX message that will be transmitted to a targeted subscriber. The method, protocol, and apparatus required for the transmission of the paging message will be discussed in detail below.

After the document has been entered into the FAX machine 14, the entire source document 26 including handwritten message or line drawing information is scanned and quantized (retrieved). Thereafter, the information is encoded and compressed by the encoder 34 in the FAX machine preferably according to the Group III FAX coding scheme which is well known to one of ordinary skill in the art. The Group III facsimile (FAX) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the information is Group III encoded and compressed, it is transferred by the modem 36 to the message controller 22 via the PSTN 24. The message controller 22 directs the information to a processor 20 for providing additional processing of the information suitable for selective call communication. After storing at least a portion of the information in a message memory 16, the processor 20 and the message controller 22 begin decoding the information before the information can be transferred to the subscribers to which it is intended. When the selective call terminal 28 has completed decoding the incoming FAX information, the information is processed according to the preferred embodiment of the present invention to be discussed in further details. Thereafter, the processed information is transferred to a receiver 38 which receives the information, and a transmitter which comprises a base station 30 and an antenna 32, broadcasts a signal modulated with the processed FAX information including the selective call address and the handwritten line drawing information. A selective call receiver 40 is then able to detect its address, recovers the information, alerts the user, and makes the received information available for presentation to the user in the handwritten line drawing format in which the information was received.

Figure 2:
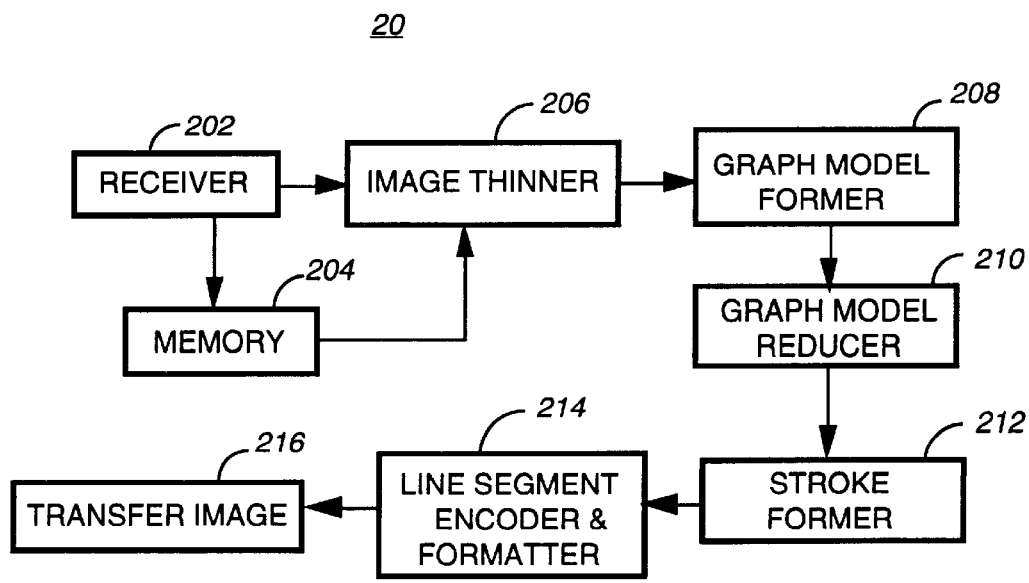
FIG. 2 is an electrical block diagram of a processor of the selective call system of FIG. 1 according to the preferred embodiment of the present invention.

Referring to FIG. 2, an electrical block diagram of the processor of the selective call system of FIG. 1 is shown according to the preferred embodiment of the present invention. Preferably, the processor 20 comprises a receiver 202 which receives the information and stores it in a memory 204. A thinning encoder which is an image thinner 206 can receive the information directly from the receiver 202 or alternately from the memory 204. The image thinner 206 thins the lines of the information by reducing the width of each line of the handwritten message or the line drawing to the thickness of one picture element (pixel). The skeleton of the line drawing is obtained via a thinning algorithm, for example, as disclosed in co-pending application Ser. No. 08/399,024, filed Mar. 6, 1995. Alternatively, any conventional thinning technique which reduces the handwritten message or line drawing to the thickness of one pixel will suffice. Thinning therefore reduces the line drawing to single pixel thickness so that any pixel not at an intersecting (discussed hereafter) node has no more than two neighbors.

An encoder which constitutes graph model former 208 encodes the extracted information into a graphical model which is further reduced by another encoder which constitutes a graph model reducer 210, and further simplified by yet still another encoder which is a stroke former 212, to be encoded by line-segment encoder and formatter 214, to enable the handwritten information to be transmitted 216, using one of the well known selective call system protocols. The details of the operation of graph model former 208, graph model reducer 210, stroke former 212, and line-segment encoder and formatter 214, are discussed in greater detail hereafter with reference to FIGS. 8–18. In this way, a handwritten note or message can be FAXed to a selective call receiver capable of displaying graphic information. The handwritten information is represented as a raster bit-map image which is downsampled to adequate resolution and compressed using line coding based upon a chain coding technique applicable to skeletonized (thinned) versions of raster scanned line drawings. Converse to electronic pen systems, the handwritten information is not captured with the (x, y) coordinate points, i.e., the time sequence of the points is not available and must be generated. Therefore, by thinning the information, a line segment is extracted and encoded in accordance with the line coding technique herein, to form strokes, which are encoded as (x, y) point pairs of strokes and further reduced by a string coding of the strokes or segments, as described hereafter, to enable reconstruction after transmission. Accordingly, the information to be FAXed represented as a scanned line drawing is formatted with the dynamic pixel information similar to electronic ink to achieve both higher compression and compatibility with selective call systems and electronic pen systems.

Figure 3:
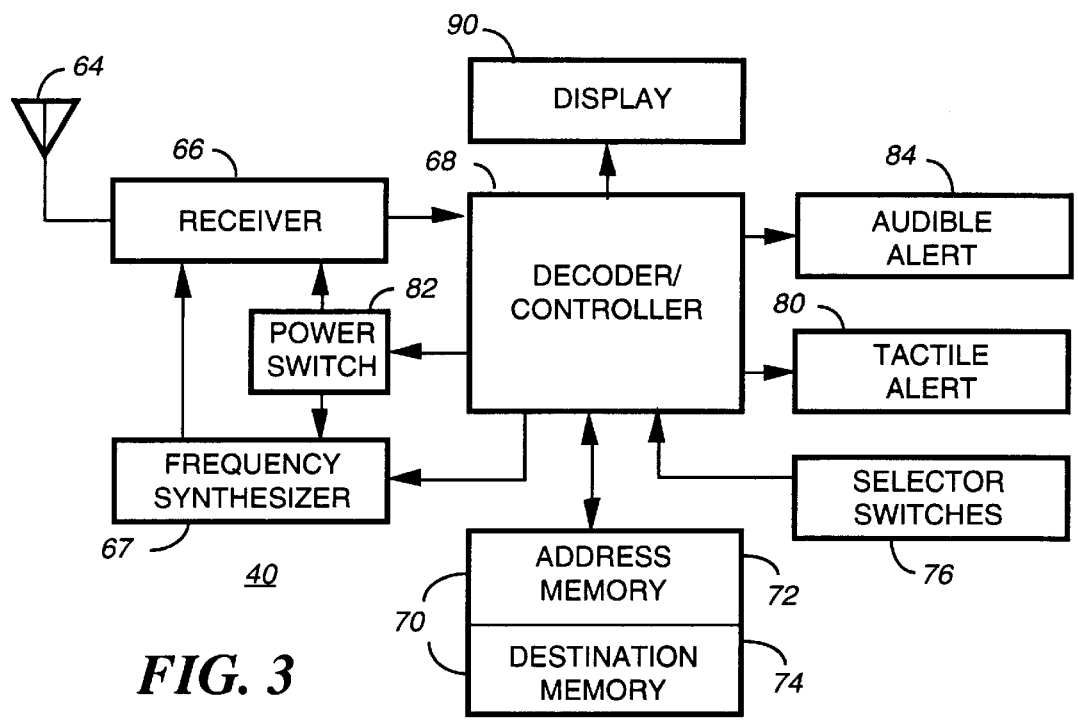
FIG. 3 is an electrical block diagram of a selective call receiver in accordance with the preferred embodiment of the present invention.

Referring to FIG. 3, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies, in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs, are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as a tactile alerting device 80. The tactile alerting device 80 preferably provides a silent vibratory output alerting the subscriber that the destination selected is being approached.

When the selective call receiver 40 is used to provide both destination notification alerting and paging capability including FAX capability, the addresses assigned to the selective call receiver 40 for use in the selective call communication system are stored in an address memory 72 portion of memory 70. The decoder/controller 68 then controls the generation by the frequency synthesizer 67 of the selective call system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76, in a manner well known in the art.

Figure 4:
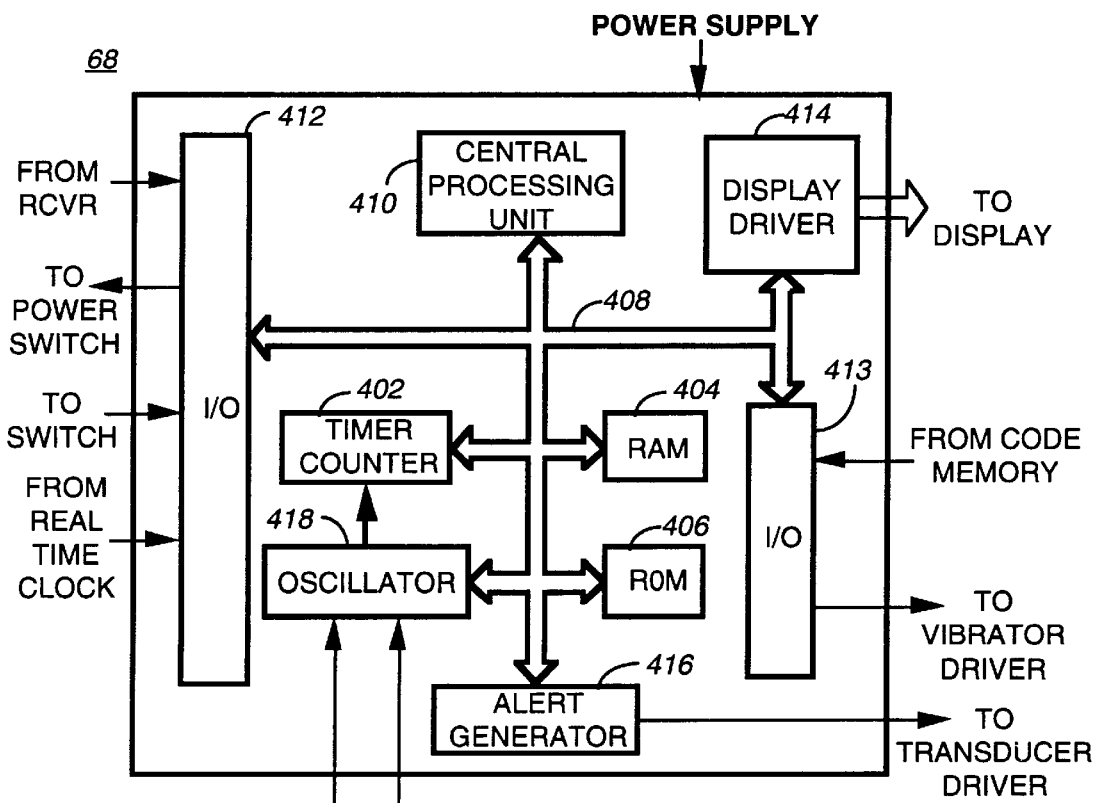
FIG. 4 is an electrical block diagram of a processor/controller of the selective call receiver of FIG. 3 in accordance with the preferred embodiment of the present invention.

The controller/decoder 68 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 68 is preferably of the family of MC68HCO5 series microcomputers, such as manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of FAX or paging information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410, and when the received address is the same as that stored within the code-plug memory which couples into the microcomputer through, for example an I/O port 413, the selective call FAX message is received and stored in RAM 404. Recovery of the stored message and selection of the predetermined destination address is provided by the switches which are coupled to the I/O port 412. The microcomputer 68 then recovers the stored message and directs the information over the data bus 408 to the display driver 414 which processes the information and formats the information for presentation by the display (output display screen) 90 (FIG. 3), such as an LCD (liquid crystal display). When the selective call receiver 40 receives its address, the alert signal that is generated can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

Figure 5:
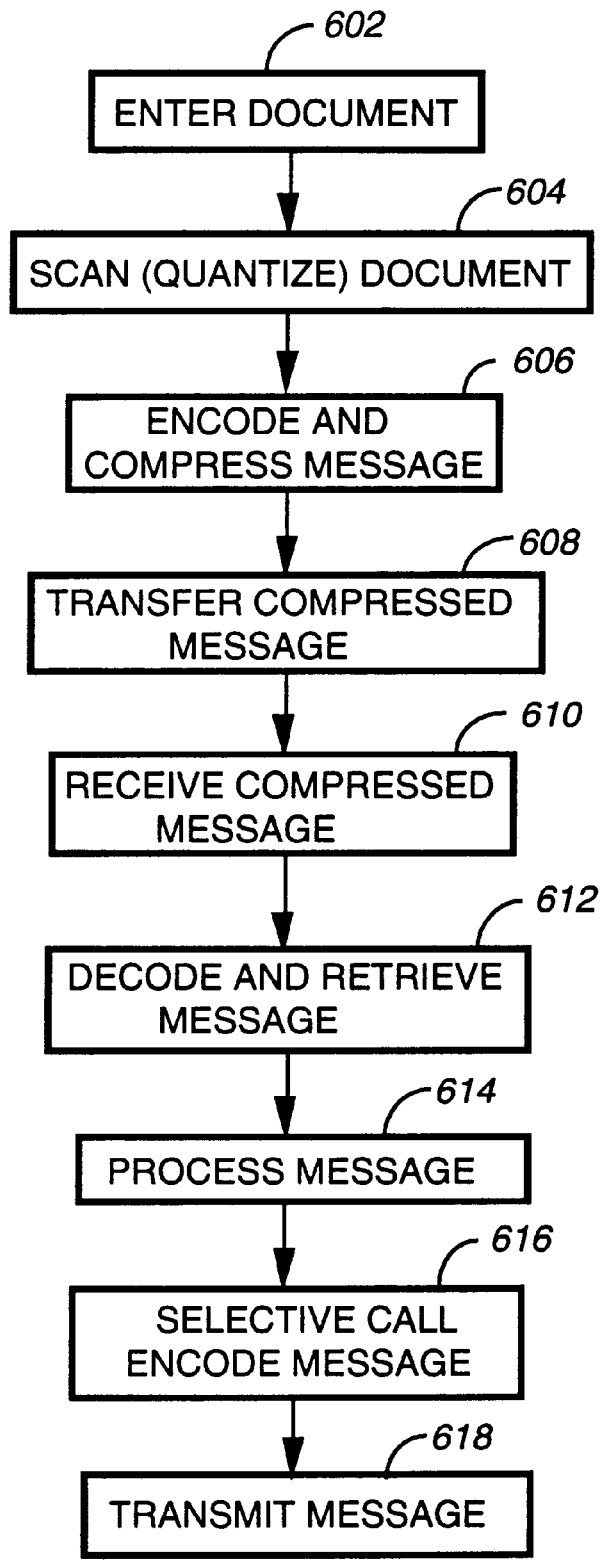
FIG. 5 is a flow diagram illustrating the operation of the selective call terminal in accordance with the preferred embodiment of the present invention.

The battery saver operation is controlled by the CPU 410. The battery saving signals are directed over the data bus 408 to the I/O port 412, which couples to the power switch 82 (FIG. 3). Power is periodically supplied to the receiver to enable decoding of the received selective call receiver address signals and the selective call FAX information which is directed to the selective call receiver 40. The information, preferably comprising the selective call FAX handwritten text information, is stored and ready to be displayed on the display 90. Referring to FIG. 5, a flow diagram is shown illustrating facsimile communication in accordance with the present invention. When the source document 26 has been entered, step 602, the FAX machine 14 scans and quantizes the information on the source document 26, step 604. The quantized information is then encoded and compressed, preferably according to the Group III facsimile standard, step 606. The encoded and compressed information is transferred from the FAX machine 14 to the message controller 22 via the PSTN 24, step 608. The message controller 22 receives the compressed information and stores it in memory to be accessed by the processor 20, which processes the compressed information before transmission to its designated selective call receiver 40, step 610. The received information is then decoded from the Group III format to retrieve the information, step 612. The information is processed, step 614, according to the preferred embodiment of the present invention, by thinning the lines of the image information, defining line segments of the image information to be extracted, and transforming it into a reduced graphical model and encoded, to be discussed hereafter. The information is then selective call encoded, step 616. In the selective-call encoding step, the information is encoded with the address of the at least one selective call receiver 40, to which the information is intended to be transmitted. The message is then transmitted to the at least one selective call receiver, step 618.

Figure 6:
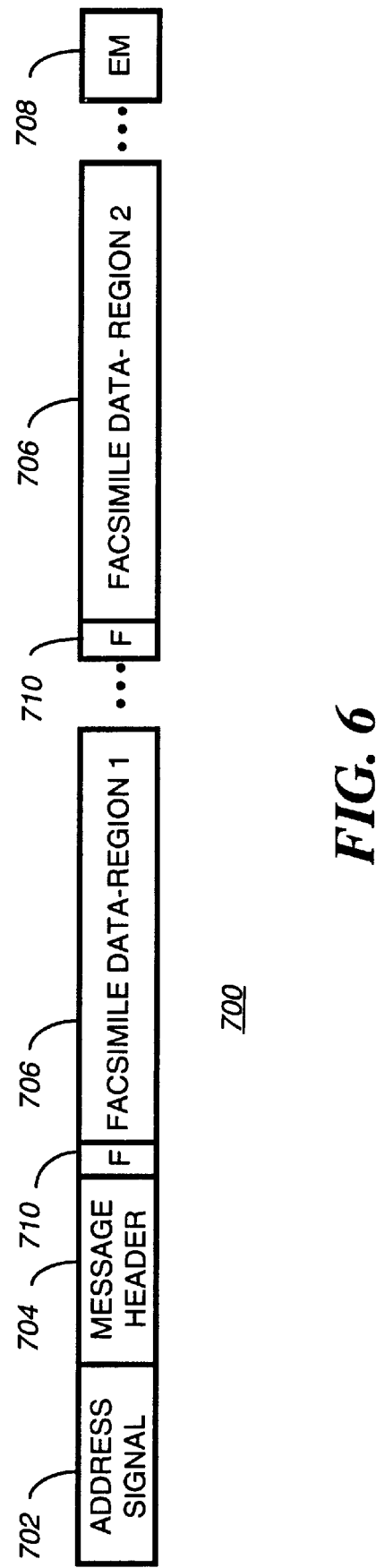
FIG. 6 is a protocol diagram of a selective call information signaling format in accordance with the preferred embodiment of the present invention.

Referring to FIG. 6, a protocol diagram of a selective call communication format is shown in accordance with the preferred embodiment of the present invention. The signaling protocol is used for addressing and transmitting facsimile information to the selective call receiver 40 using any facsimile standard. A FAX paging information packet 700 comprises a selective call address 702, a facsimile message header 704, format or message type identifier 710, data blocks 706 encoded in Group III facsimile data, and an end-of-message flag 708. The end-of message flag 708 can be omitted without compromising the integrity of this signaling format. The address signal 702 comprises a conventional selective call address of a type that is well known to one of ordinary skill in the art. The message header 704 contains information on the data block length, FAX protocol type, a data flag to determine if a FAX or a regular paging message is being received, and possibly an encryption type for use in a secure FAX messaging system. Following the message header 704 is the format identifier 710 which identifies the format of the information. Following the format identifier 710 is the data block 706 containing standard facsimile data of the format or type indicated by the format identifier. This embodiment can be used in conjunction with a conventional FAX machine to receive FAX messages via a wireless data channel. Furthermore, when used in conjunction with a personal computer or the like (e.g., a laptop computer), the selective call receiver 40, as illustrated in FIG. 3, can couple the received FAX message data to the computer for storage in a file, thus allowing the user to have an archive of the received FAX messages.

Figure 7:
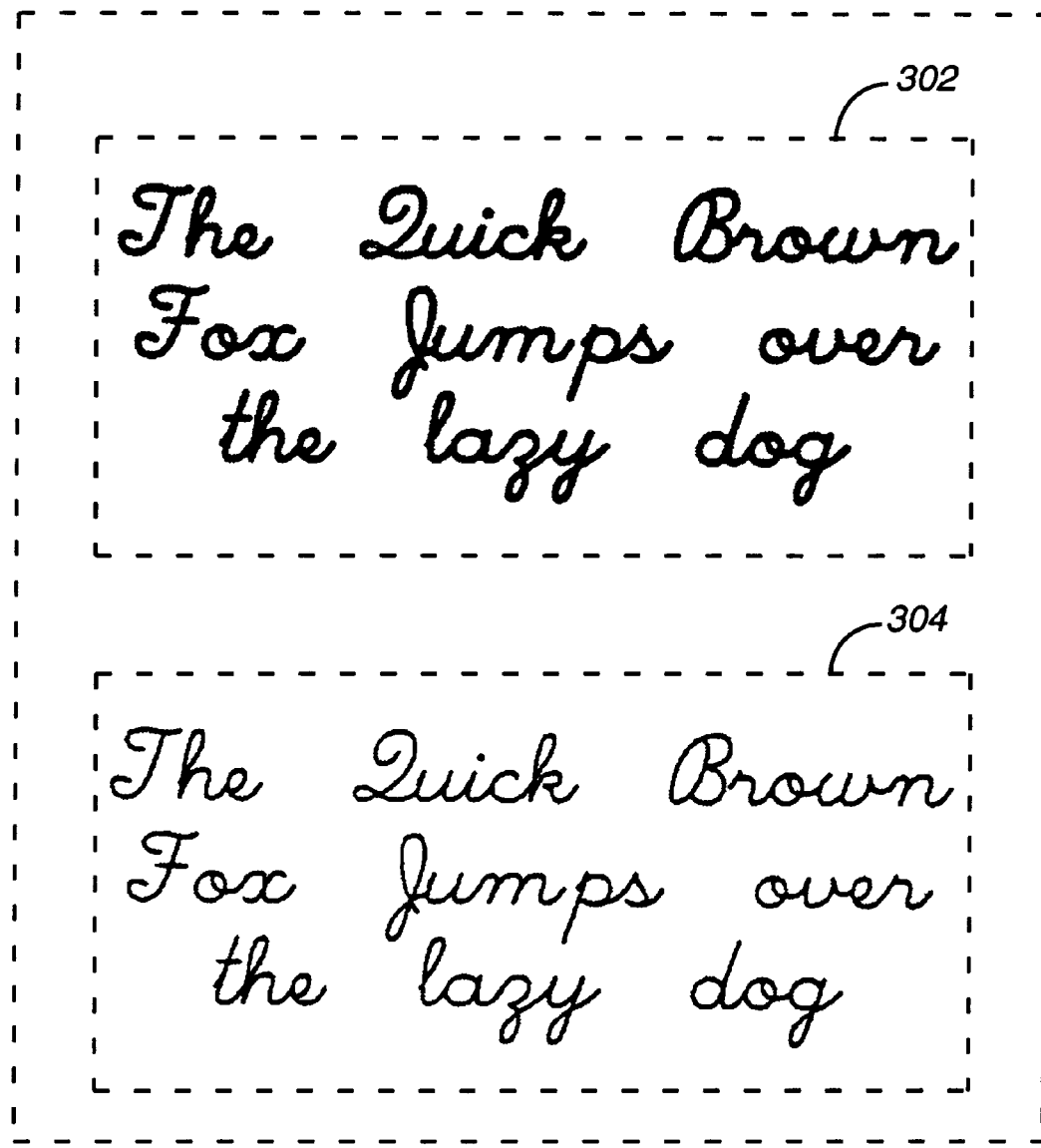
FIG. 7 illustrates handwritten information in originally input form and, after initial processing, in thinned-line form before the processing in accordance with the preferred embodiment of the present invention.

Referring to FIG. 7, an image of the handwritten text message or line drawing is shown according to the preferred embodiment of the present invention. The image comprises the handwritten message 302 before the image is thinned and the handwritten message 304 after the image is thinned, into a one-pixel wide skeletonized form.

In accordance with the invention, the image of the handwritten information is read into the processor. The image comprises a FAX message transmission of the handwritten or line drawing message from the fax machine. The handwritten message signal is represented as a raster bitmap image downsampled and compressed using Huffman coding, as previously discussed. It is desired to encode the handwritten message such that it may be compressed using line-follow coding and stored in electronic ink format, as described hereafter. The compression advantage of line coding can range from two to ten times over Huffman coding. Electronic ink compression, however, requires the dynamic sequence, i.e., the (x, y) coordinates, of ink pixels to be known. This information is not contained in the handwritten information in a raster bit-map format. Therefore, to achieve the higher compression ratios of the electronic systems, the dynamic sequences (x, y) coordinates of the pixels must be recreated. This invention provides a means for representing a scanned line drawing, that does not have the dynamic pixel information, as ink to achieve both higher compression ratio and compatibility with electronic pen systems. To estimate line segments, the handwritten message is reduced to a skeleton image for the purpose of determining the (x, y) coordinates. The skeleton of the drawing is obtained by a thinning algorithm. Thinning reduces the line drawing to single pixel thickness so that any pixel not at an intersecting node has, at most, two neighbors. FIG. 7, as discussed previously, illustrates a scanned line drawing before 302 and after thinning 304. After the thinning algorithm is used to obtain the skeleton of the handwritten message, the thinned drawing is then processed according to the invention.

Figure 8:
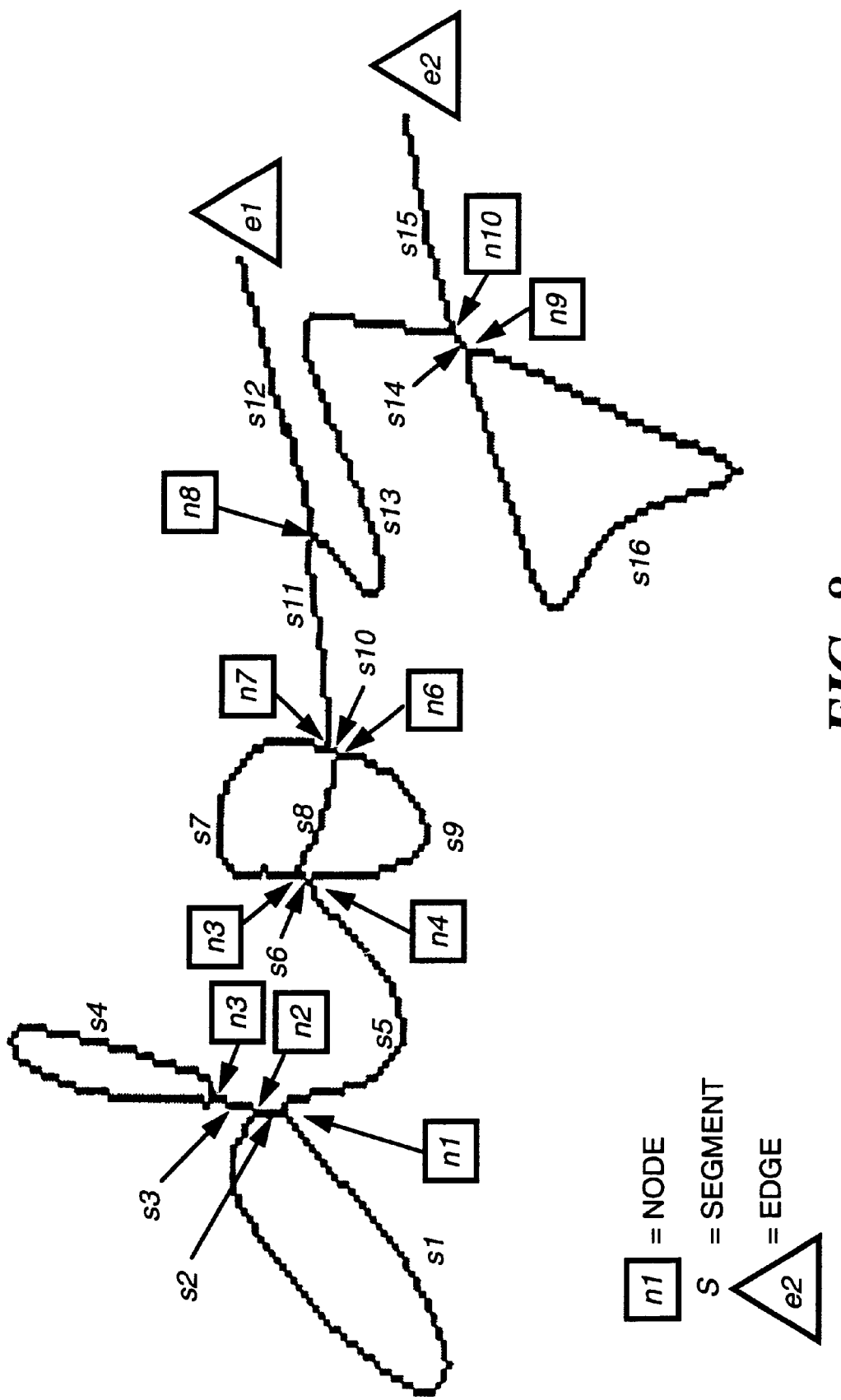
FIG. 8 is an illustration of a thinned-line form of a scanned word showing initial processing in accordance with the present invention.

Referring to FIG. 8, an image is illustrated which has been scanned from top to bottom and from left to right in a conventional raster scan. This image has been skeletonized or thinned, to have a thickness of one pixel, and each pixel not at an intersecting node or edge, has exactly two neighboring pixels. A node is defined as a pixel in the scanned, thinned image with three or more neighboring pixels. An edge is defined as a pixel with only one neighboring pixel. A segment is an array of consecutive pixels. Nodes n, edges e, and segments s are illustrated in FIG. 8. The nodes n, edges e, and segments s are identified as part of a graphical modeling scheme which results in a reduction in the number of continuous pen strokes of a line drawing to improve compression.

As previously discussed, a major objective of FAX message communication is to minimize the amount of information transmitted over the wireless link, for faithful reproduction. The system described herein employs a line-follow coding technique with the task of reducing the number of strokes being approached in three phrases.

The first phase is illustrated, as discussed above in FIG. 8, by identifying and extracting all the nodes n, segments s, and edges e, from a thinned image to form a graphical model illustrating their layout. The model contains all the nodes n, segments s, and edges e, of a bunch of pixels connected to each other, and is called a connected component. A separate model is constructed for each connected component since the layout of each connected component is unique in terms of nodes n, segments s, and edges e.

To extract the connected components, an image is scanned from top to bottom and from left to right until the first black pixel is located. Then the stroke is traced until a node or an edge is encountered, if the path cycles back to its original pixel location, indicating the connected component has neither nodes n nor edges e, such as in the case with the letter "O," then a neighboring pixel is removed and the stroke is traced again. If an edge e is encountered, then the trace is continued in the opposite direction. If an edge e is encountered for the second time, then the connected component consists of just one segment s and two edges e, and this segment forms a stroke by itself.

A node n is initiated if a pixel with more than three neighbors is encountered. In this case, all segments s tied to the node n are initialized and each of them is traced, in turn, until another node n or an edge e is encountered. All the pixels are deleted as the segments are being traversed, and based upon whether the next encountered node n is a previously established node n or a new node n, the data structures pertaining to the nodes n are updated. If the newly met node n is a fresh node n, then the segments extending from this node n are marked to be traced once all of the segments s of the current node n are traced. This process is continued until all the segments s connected to all the nodes are traversed. More specifically, FIG. 8 shows one connected component and the different segments identified as a result of the scanning from left to right of each segment individually, based upon the above-described methodology.

Figure 9:
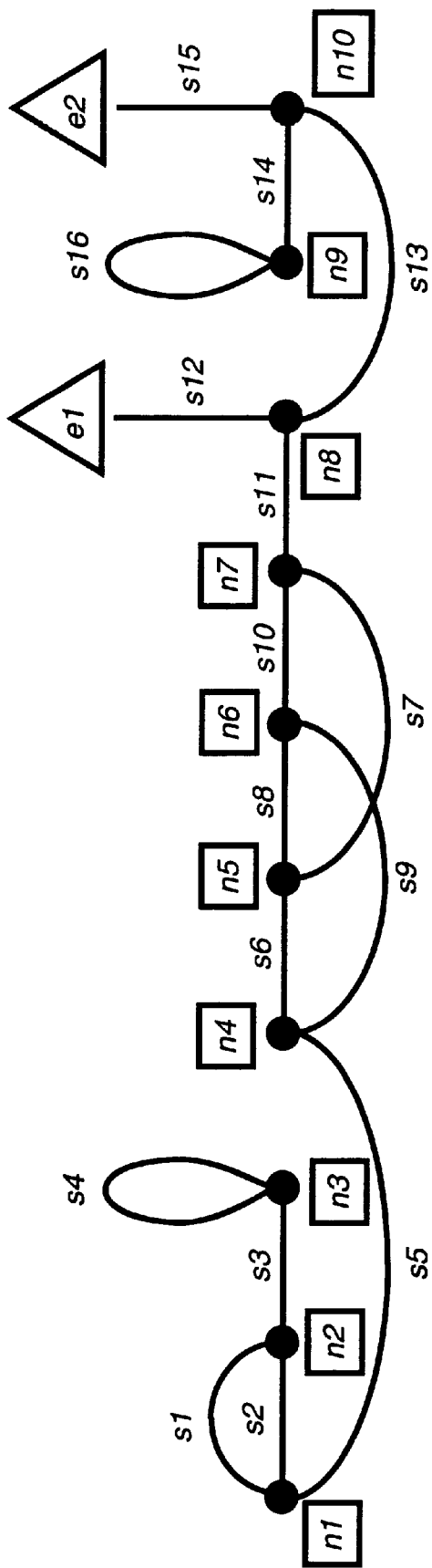
FIG. 9 illustrates a graphical model of the handwritten information of FIG. 8 after initial processing in accordance with the invention.
Figure 10:
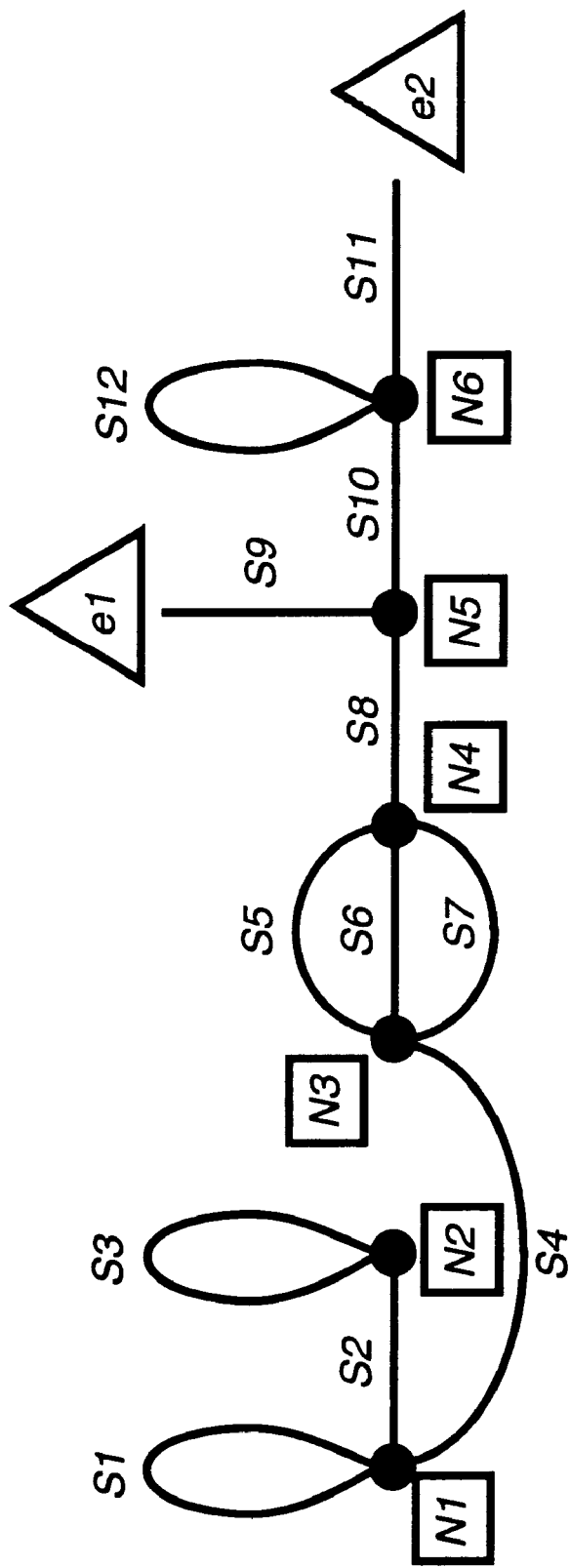
FIG. 10 illustrates a simplified version of the graphical model of FIG. 9 after further processing in accordance with the invention.

In the second phase, the connected component of FIG. 8 which has been converted using the identified nodes n, segments s, and edges e, to result in a graphical model like that illustrated in FIG. 9, which is now further reduced to that shown in FIG. 10. More specifically, in this phase, any two segments s having edges separated by just one white pixel are joined together to form a single segment S. Also, very short segments s of FIGS. 8 and 9 are eliminated. The assumption here is that a very short segment is of hardly any significance on the legibility of the message. Thus, segments s2, s6, s10 and s14 of the image in FIGS. 8 and 9 can be removed from the graphical model.

A further step to shrinking the graphical model is to combine two or more nodes n located closer than a threshold distance. Thus, nodes n1 and n2, n4 and n5, n6 and n7, and n9 and n10; of the image in FIG. 8 and the model of FIG. 9, are joined to form nodes N1, N3, N4, N6, respectively. It can be seen that the process has permitted shrinking of the original state model from 10 nodes and 16 segments to result in a shrunken, original state model to one that includes 6 nodes and 12 segments (N1–N6 and S1–S12), shown in FIG. 10. By way of comparison, in FIG. 10, node N1 corresponds to nodes n1 and n2 of FIG. 8 and FIG. 9, and segment S2 corresponds to original segment s3. Segment s1 of FIG. 10 corresponds to segment s1, segment S3 corresponds to segment s4, segment S4 corresponds to segment s5, and node N2 corresponds to node n3. In the same manner, one of ordinary skill in the art can determine, by viewing the remaining segments S, nodes N, and edges E of FIG. 10, how they correspond to the original segments s, nodes n, and edges e of FIGS. 8 and 9.

In the third phase it is desirable to connect as many segments S as possible into strokes so that all of the segments S are represented with the least number of strokes. In order to achieve this, preprocessing is done to the simplified graph model of FIG. 10, to make the task of forming longer strokes easier. The pre-processing operation includes temporarily removing components known as leaves, loops, and zig-zags from the graph. Leaves, loops, and zig-zags are defined as follows:

a) A leaf is a segment between a node and an edge, for example, as shown by segments S9 and S11;

b) a loop is a segment originating and terminating at the same node, for example, as shown by segments S1 and S12 in FIG. 10; and c) a zig-zag is a combination of two segments originating at the same node and terminating at the same but a different node from origination, for example, as shown by segments S5 and S6 in FIG. 10.

Thus, suppose N is a node associated either with a loop or a zig-zag, then the purpose of ignoring loops and zig-zags from the process of stroke formation is that they can always be incorporated into the string of segments (a stroke) at a later time, provided that the particular stroke passes through the node N. Leaves, on the other hand, can subsequently be coupled to the end of the stroke if the termination of a stroke and a leaf share the same node n.

Figure 11:
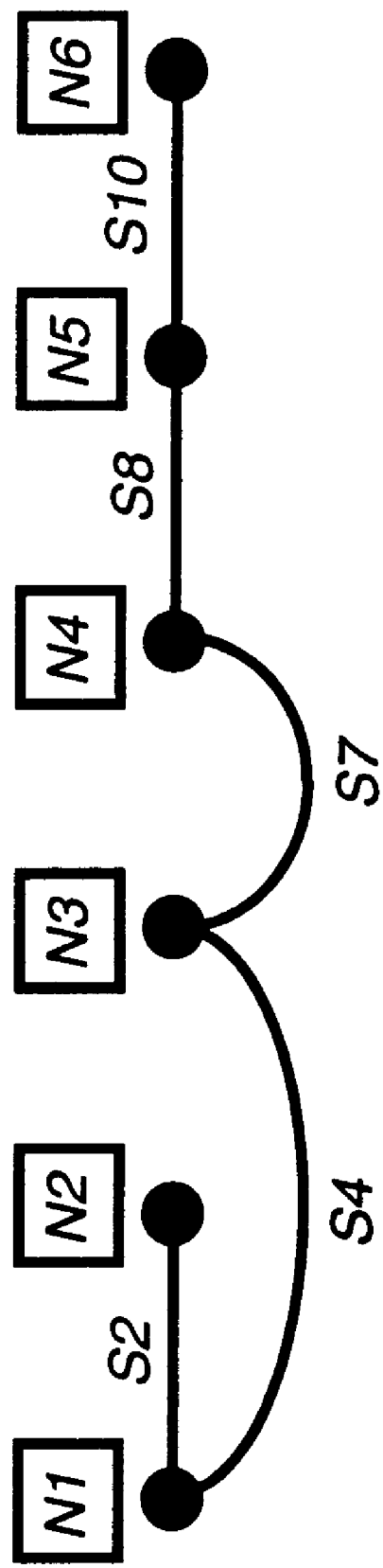
FIG. 11 illustrates a further simplified version of the graphical model of FIG. 10 after further processing to delete leaves, loops, and zig-zags.

FIG. 11 shows the graphical model which results after removing leaves, loops, and zig-zags. Thus, the next step is to trace the segments from node N to node N, starting from the very first node N1, until the longest string of segments is found. While the segments are being traced, they are invalidated so that the same segment is not confronted twice. If a node N with two or more remaining branches is encountered during this trace, each path is followed independently, and the highest number of segments encountered in each of the traverses are recorded. This is a recursive process where one tracing out of a multiple choice of branches off a node can lead to another node with multiple branches. As can be appreciated, all of the traces combined together may form a tree structure. The longest string of segments obtained from the tree structure of traces is then extracted and recorded as a stroke. This process is continued on the remaining segments until all of them are formed into strokes. Thus, with reference to FIG. 11, typical strokes which are extracted from the graph, include stroke 1, which is equal to segments S4+S7+S8+S10. Similarly, the second stroke would be S2, since it branches independently off node N1 from stroke 1.

After the initial formation of strokes, the two terminating nodes of each of the strokes are examined in an effort to merge two potential strokes. If any two strokes share the same terminating node, they are joined to form a single stroke, thus, for both strokes 1 and 2 described above, node N1 is a common terminating node. They will be merged to form one stroke (S2+S4+S7+S8+S10). Each zig-zag, loop, and leaf removed earlier from the graphical model will now be joined to a stroke, provided that both share a common node. Thus, for the graph of FIG. 11, loops S3, S1, and S12; zig-zag S5 –S6; and leaf S1 1 of FIG. 9, are joined to the stroke at appropriate nodes N, to form the stroke (S3+S2+S1+S4+S5+S6+S7+S8+S10+S12+S11). The zig-zags, loops, and leaves that cannot be incorporated into any of the existing strokes, will form strokes by themselves, such as, for example, as shown by S9. Although the image in FIG. 8 looks complicated in terms of the layout of nodes, segments, and edges, as can be seen with the above methodology, the algorithm has narrowed the amount of information to only two strokes (S3+S2+S4+S5+S6+S7+S8+S10+S12+S11) and (S9).

Accordingly, formation of the least number of continuous pen strokes of any given thinned image is ensured with little visual degradation in image quality. The reduction in the number of strokes automatically reduces the amount of information transmitted over a wireless medium, since the number of initial coordinates, i.e., pen-downs, that have to be coded absolutely, decreases proportionately.

Figure 12:
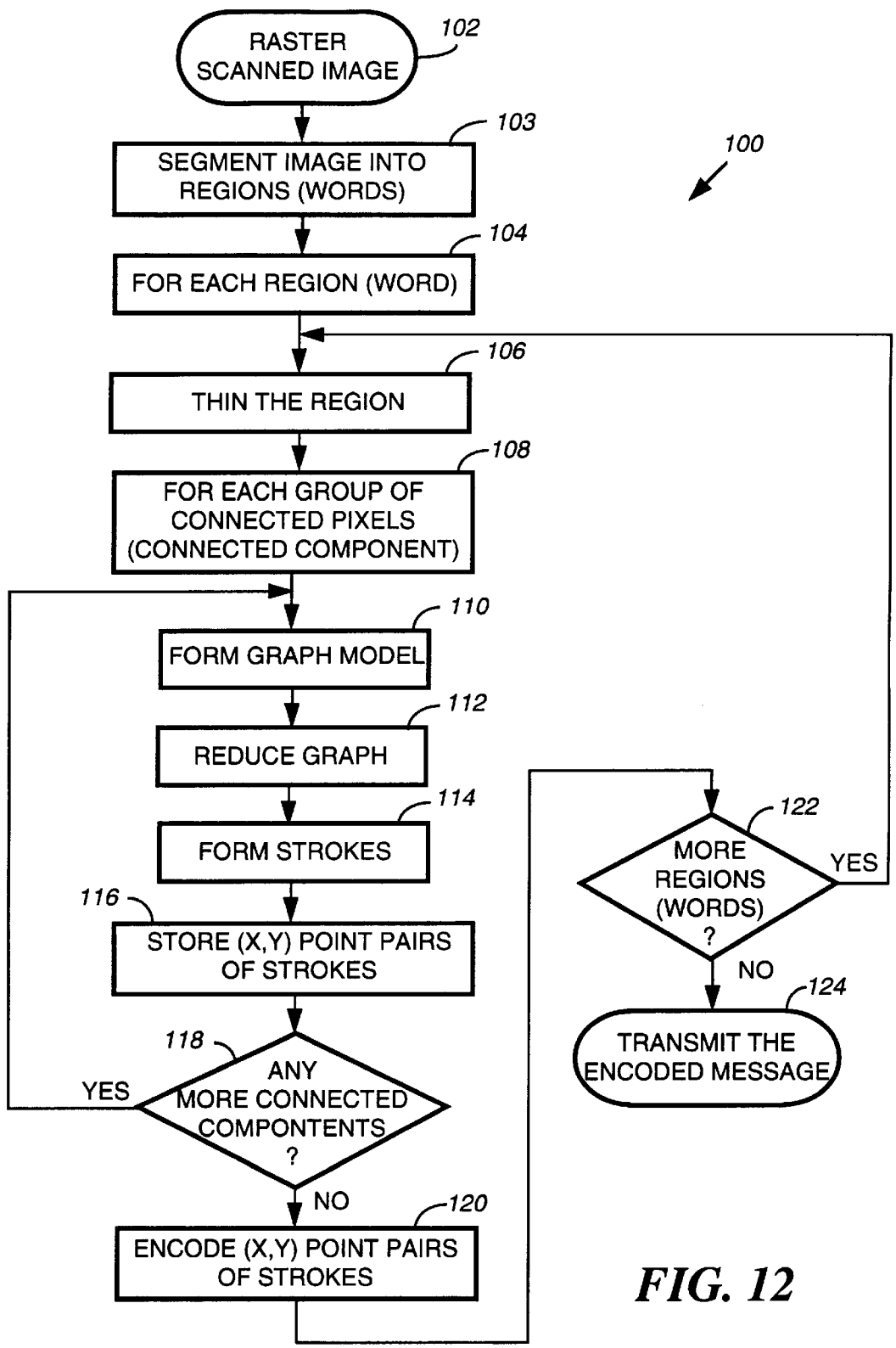
FIG. 12 is a flow diagram showing the operation of the fax paging terminal in accordance with the invention.

Referring to FIG. 12, there is shown a flow diagram of the operation of the FAX paging server, including the previously described forming of a graphical model, reducing the graph and forming the strokes, as well as the further step of encoding (x, y) point pairs of strokes to further compress the data prior to transmission. The further encoding of point pairs will be described hereafter, particularly with reference to FIGS. 16–18.

The flow diagram 100 of FIG. 12 includes a first step 102 in which the image to be transmitted is raster scanned. The image is then segmented into regions (words), step 103. For each region or word separately identified, step 104, the region is thinned to be a single pixel wide, step 106, as previously described. The thinning can be done in one of a number of ways, including the method described in co-pending U.S. patent application Ser. No. 08/399,024 filed Mar. 6, 1995. For each group of connected pixels, they are identified as connected component, step 108, from which a graphical model is formed, step 110, such as that of FIG. 9, by graph model former 208, previously discussed. Thereafter, the graphical model is reduced, step 112, to one similar to that illustrated by FIG. 10, by graph model reducer 210. From this reduced graphical model strokes are formed, step 114, from a simplified model without leaves, loops, or zig-zags, similar to that illustrated by FIG. 11, by stroke former 212. Thereafter, the (x, y) point pairs of strokes are stored, step 116, and a determination is made if there are any more connected components, step 118. If there are more connected components, then the process is repeated through steps 110–118, until there are no more connected components. The (x, y) point pairs of strokes are then encoded, step 120. After encoding, a determination is made if there are more regions or words, step 122. If the answer is "yes," then the process is repeated by returning to steps 106 through 120. If the answer is "no," then the encoded message is transmitted at step 124.

Figure 13:
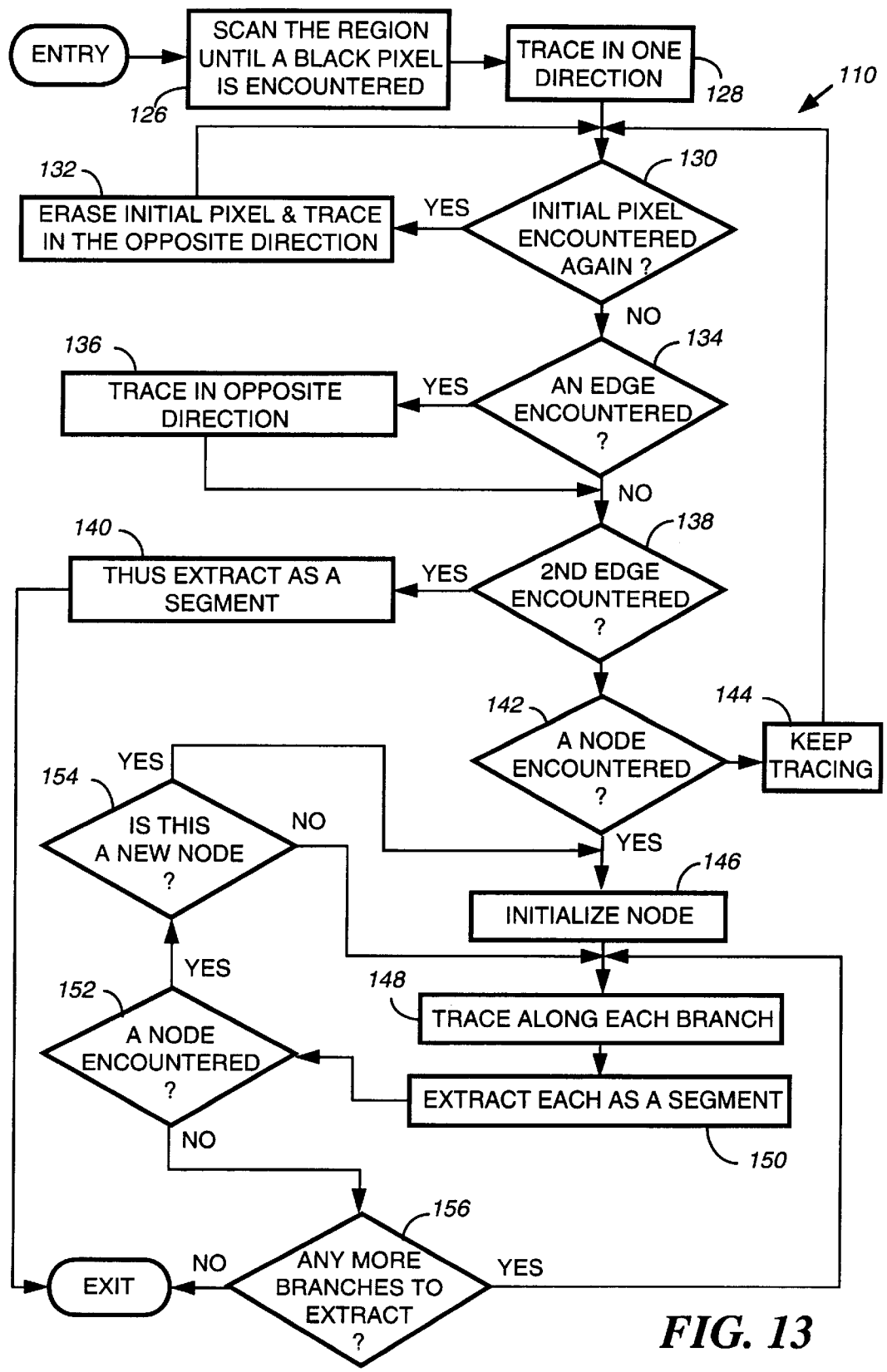
FIG. 13 is a flow diagram showing how the graphical model of FIG. 9 is formed from handwritten information.

Referring to FIG. 13, the step 110 formation of the graphical model is illustrated in greater detail through the flow chart illustrated therein. In step 110, the region of interest is scanned until a black pixel is encountered, step 126. Tracing is then commenced in one direction, step 128. If during the trace the initial pixel is encountered again, step 130, then the initial pixel is erased and a trace commenced in the opposite direction, step 132. If the initial pixel is not encountered again, then it is determined if an edge is encountered, step 134. If the answer is "yes," then a trace is commenced in the opposite direction, step 136. If the answer is "no," then it is determined if a second edge is encountered, step 130. If the second edge is encountered, it is extracted as a segment, step 140, and the subroutine exits.

If a second edge is not encountered, an inquiry is made to see if a node is encountered, step 142. If a node is not encountered, tracing is continued, step 144, and the subroutine returns to step 130. If a node was encountered at step 142, then the program initializes the node, step 146, traces along each branch, step 148, and extracts each branch as a segment, step 150. If a node is again encountered, step 152, then it is determined whether this is a new node, step 154, and if the answer is "yes," the program returns to step 146. If the answer is "no," the subroutine returns to step 148. If a node is not encountered, step 152, an inquiry is made as to whether there are any more branches to extract, step 156. If the answer is "yes," the program returns to step 148, and if the answer is "no," the program exits.

Figure 14:
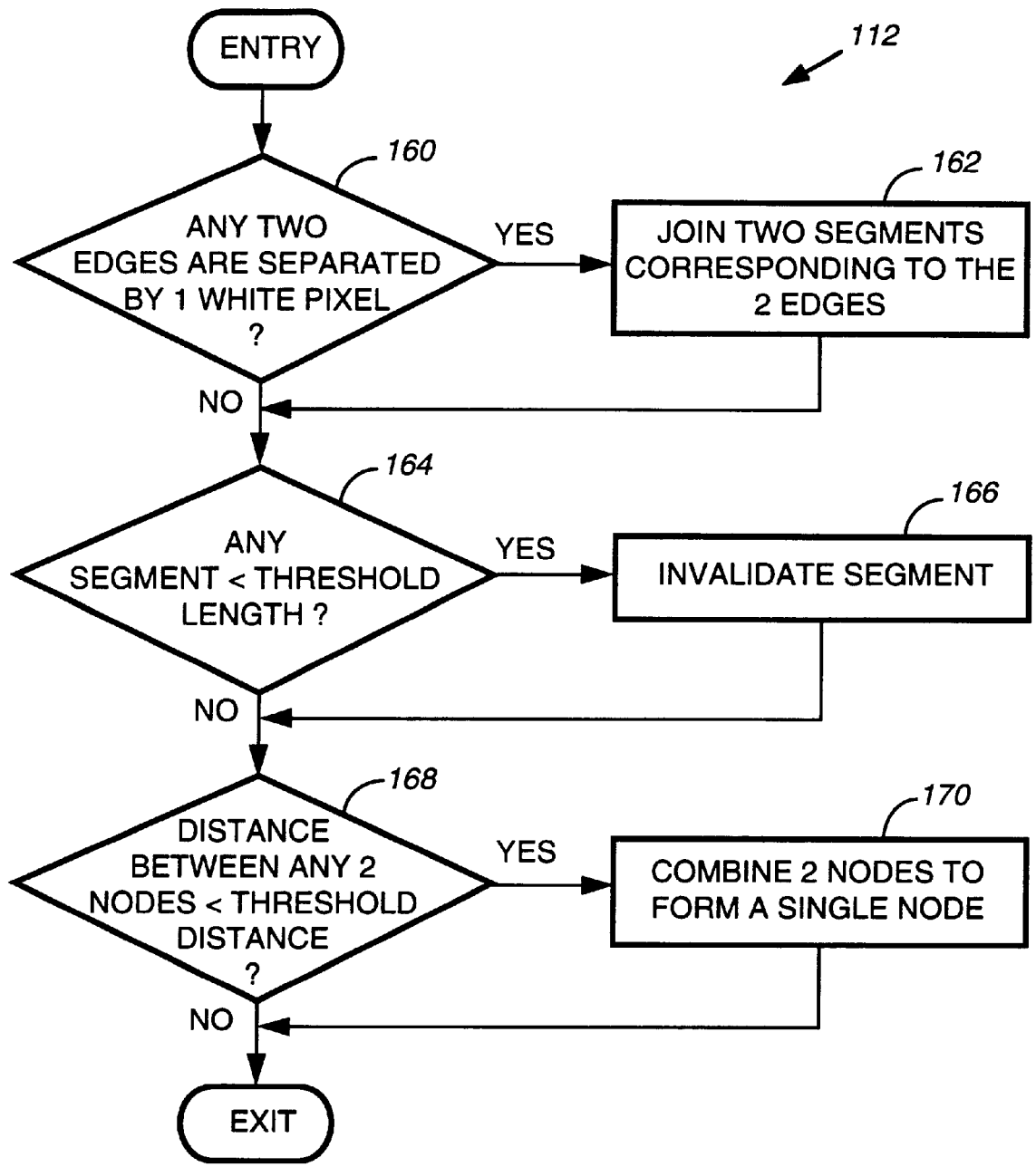
FIG. 14 is a flow diagram illustrating how the graphical model of FIG. 9 is reduced to form the graphical model of FIG. 10.
Figure 15:
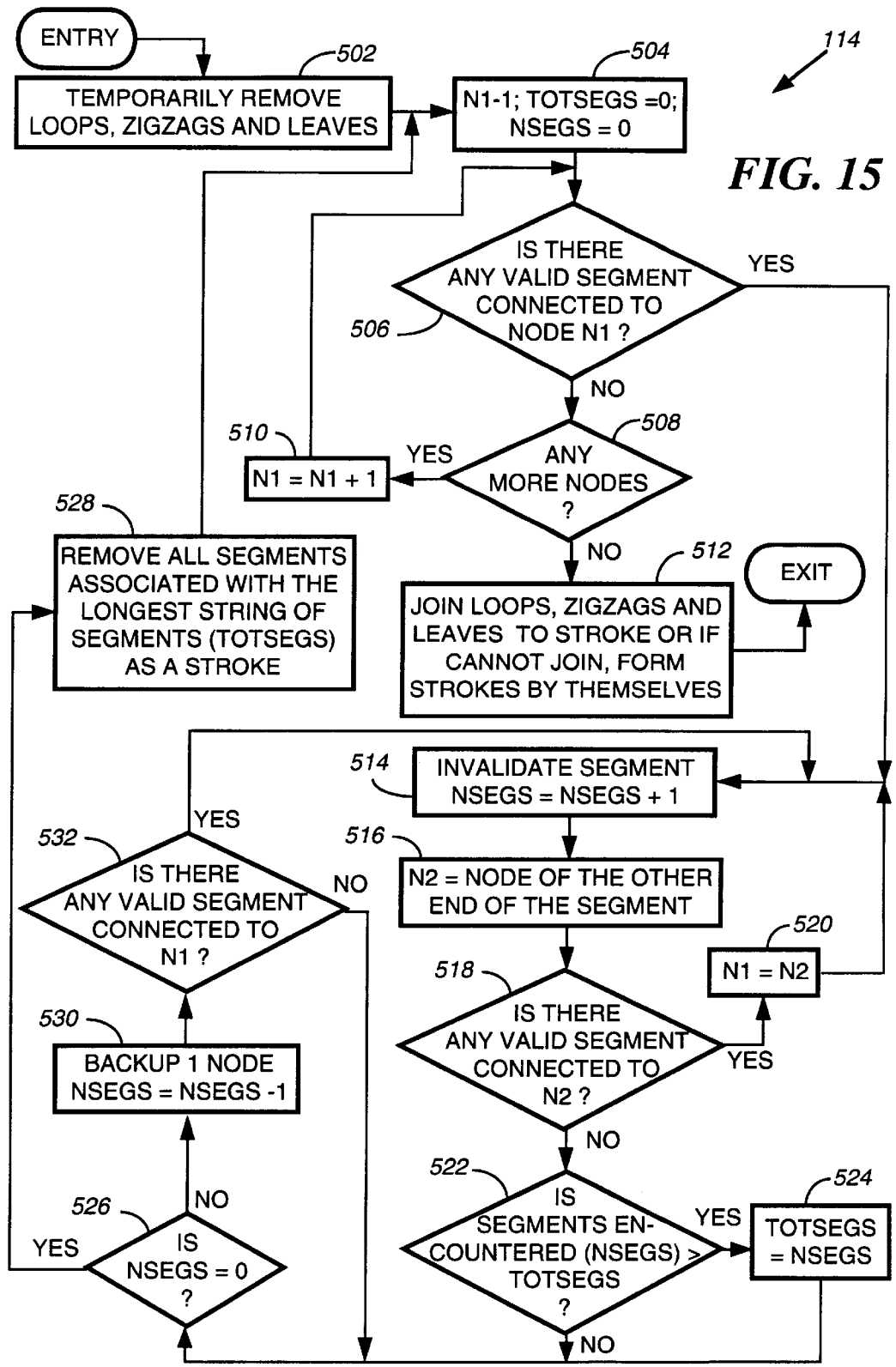
FIG. 15 is a flow diagram illustration how the graphical model of FIG. 10 is further reduced by eliminating leaves, loops, and zig-zags, to result in the simplified model of FIG. 11.

Referring to FIG. 14, the subroutine 112 for reducing the graph of FIG. 12 is illustrated therein, and upon entry into the subroutine 112, a determination is initially made as to whether any two edges are separated by one white pixel, step 160. If any two edges are separated by one white pixel, then two segments corresponding to the two edges are joined, step 162. A threshold length has been set for segments of little or no significance, as previously discussed, and a determination is made if any segment is less than the threshold length, step 164. If a segment is less than the set threshold length, then that segment is invalidated, step 166. Similarly, a determination is made as to whether the distance between any two nodes is less than a set threshold distance, step 168. If the answer is "yes," then the two nodes are combined to form a single node, step 170, and the program moves to the next subroutine 114, for forming strokes, shown in FIG. 12, and illustrated in greater detail in FIG. 15.

In subroutine 114, loops, zig-zags, and leaves are first temporarily removed, step 502, as was previously described. The first node, N1, is set to a value equal to 1, the total number of segments, TOTSEGS, is set to a value equal to 0, and the number of segments in the current string of segments, NSEGS, is set to a value equal to 0, step 504. It is then determined if there is any valid segment connected to node N1, step 506, and if the answer is "no," then a determination is made if there are any more nodes, step 508. If the answer is "yes," then node N1, is set equal to N1+1, step 510, and the subroutine returns to step 506. If there are no more nodes, then the loops, zig-zags, and leaves, are joined to create strokes, or if not possible to join them to strokes, form strokes by themselves, step 512, and the subroutine exits and continues to step 116 of FIG. 12.

At step 506, if a determination is made that there are valid segments connected to node N1, then the subroutine passes to step 514, in which the segment is invalidated by setting NSEGS=NSEGS+1. Thereafter, at step 516 a second node N2 is set as equal to the node at the other end of the segment. It is then determined if there is a valid segment connected to node N2, step 518, and if the answer is "yes," node N1 is set equal to node N2, step 520, and the subroutine returns to step 514. If the answer is "no," then a determination is made if the segments encountered are such that NSEGS is greater than TOTSEGS. If the answer is "yes," then TOTSEGS is set equal to the number of segments encountered, NSEGS.

At step 526, it is determined if NSEGS is equal to 0, and if the answer is "yes," at step 528, all segments associated with the longest string of segments (TOTSEGS) are removed as a stroke and the program returns to step 504. If the answer is "no," then at step 530, the program backs up one node and sets NSEGS equal to NSEGS1. At step 532 it is determined if there is any valid segment connected to node N1, and if the answer is "no," the program returns to step 526, but if the answer is "yes," the process is repeated, beginning with step 514.

As noted previously, after the strokes are formed at step 114, the (x, y) point pairs of strokes are stored at step 116, and after determining that there are no more connected components, in accordance with the system herein, further encoding of the (x, y) point pairs of strokes is done at step 120, to further compress and code the extracted line segments for the purpose of storage and transmission in a manner which is efficient and tolerant to channel errors. As is well known to those of ordinary skill in the art, pen systems encode electronic ink by tracing the x and y coordinates of a curve trace, which starts at a certain location, which is known as a "pen-down" location, and ends at another location, which is known as a "pen-up" location, inside a frame of picture elements defined on a rectangular grid. In the FAXed messaging system of the invention, which consists of scanned, line drawings, the time sequence of the points is not available. In accordance with the system herein, extracted line segments, which have been previously obtained, are compressed and coded for the purpose of storage and transmission, in a manner which is efficient and tolerant to channel errors.

The line segment coordinates (x, y) are coded as a chain of incremental direction vectors. Thus, if considering an 8-pixel neighborhood, a trajectory can be traced for a given line segment that consists of vectors with eight directions. High compression can be achieved by efficient coding of the direction vectors. Histograms of the direction vectors in handwriting show that relative deviations, i.e., increments, of +1, 0, and −1, between successive vectors, make up more than 80% of the direction vectors. To make use of this correlation, each vector is coded as one of three relative vectors (+, 0,−). If the vector does not fall within one of the three relative vectors, it is encoded as one of the remaining absolute vectors.

Thus, any sequence of relative vectors is grouped into sets of three, called a string. There are 27 complete string sets, and 12 incomplete sets. A string is considered incomplete when either an absolute vector or a "pen-up" occurs. The 39 possible combinations of strings can be coded with 6 bits. In addition, a bit is needed to indicate whether the string is followed by another string or a vector. Since truncated strings, by default, indicate a transition, they do not require a bit, and only the 27 complete strings require a bit to indicate a transition, providing a total of 66 (39+27) needed combinations. This is just over the 64 combinations allowed with 6 bits. In order to avoid allocating the transition bit, strings containing only one relative vector are coded as absolute, thereby reducing the combination to 63. It is then possible to code the strings as well as the string transition information in 6 bits.

In prior Application Ser. No. 08/399,024, filed Mar. 6, 1995, it was discussed that direction vectors can be generated from an 8 pixel neighborhood. For purposes of the invention, this can be viewed as a square coding ring of size 1, where M is set equal to 1, to define eight (8×M) possible displacements relative to the center pixel. In general, the ring size is selected to correspond to the desired resolution so that the larger the ring size, the lower the resolution, and the higher the compression achieved. Ring sizes from 4–8 are reasonable for FAX messages and are estimated from the average word height in the scanned image. The ring size is passed as a parameter to the compression algorithm. The ring size, M, determines the number of bits needed to code the absolute vectors. Thus, for M=6, there can be M×8=48 total absolute vectors requiring 6 bits to code each.

In addition, it is necessary to code the position of the starting endpoints of the line segments and indicate the end of a line segment. The (x, y) position of the first line segment's starting endpoint is coded absolutely. Subsequent starting endpoints are coded relative to the ending-point of the previous line segment. The number of bits to allocate to code end-points is calculated a priori as the maximum distance in x or y for all the line segments in the region. To indicate the end of a line segment, the last remaining code word out of the 64 combinations of the code words can be used to indicate the end of a string.

As may be appreciated by those of ordinary skill in this art, the line-segmenting algorithm described previously, particularly with reference to FIGS. 13, 14, and 15, combined with the chain coding described herein, provide, on average, a factor of two improvement in compression over the previous technique using run-length/Huffman coding with custom tailored code books. The average size of a handwritten message consisting of 8–12 English, cursive words is then reduced to about 0.5 kilobytes of storage.

Figure 16:
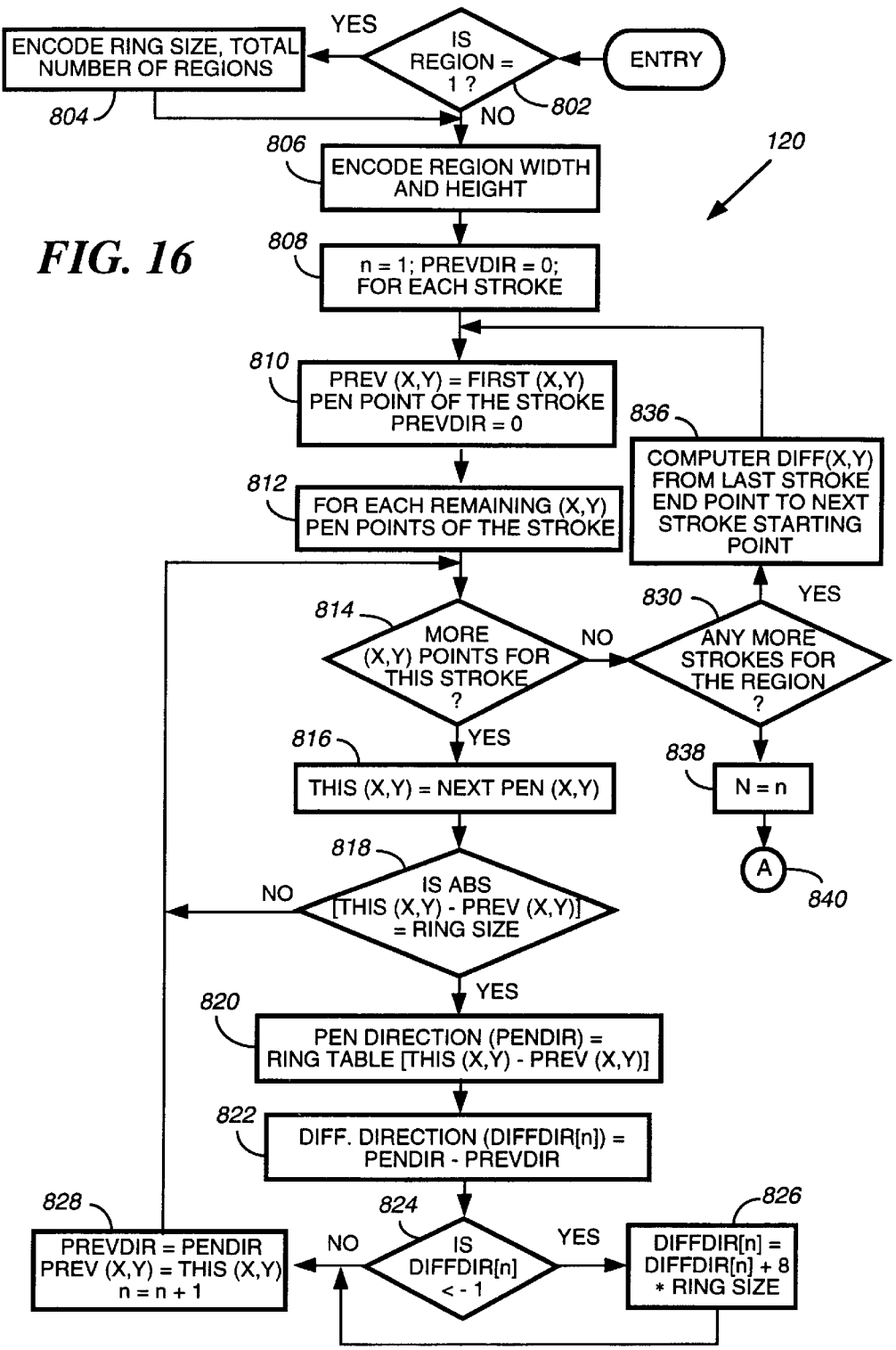
FIG. 16 is the first part of a flow chart illustrating how the simplified model of FIG. 11 is encoded as (x, y) point pairs of strokes for transmission to a pager.
Figure 17:
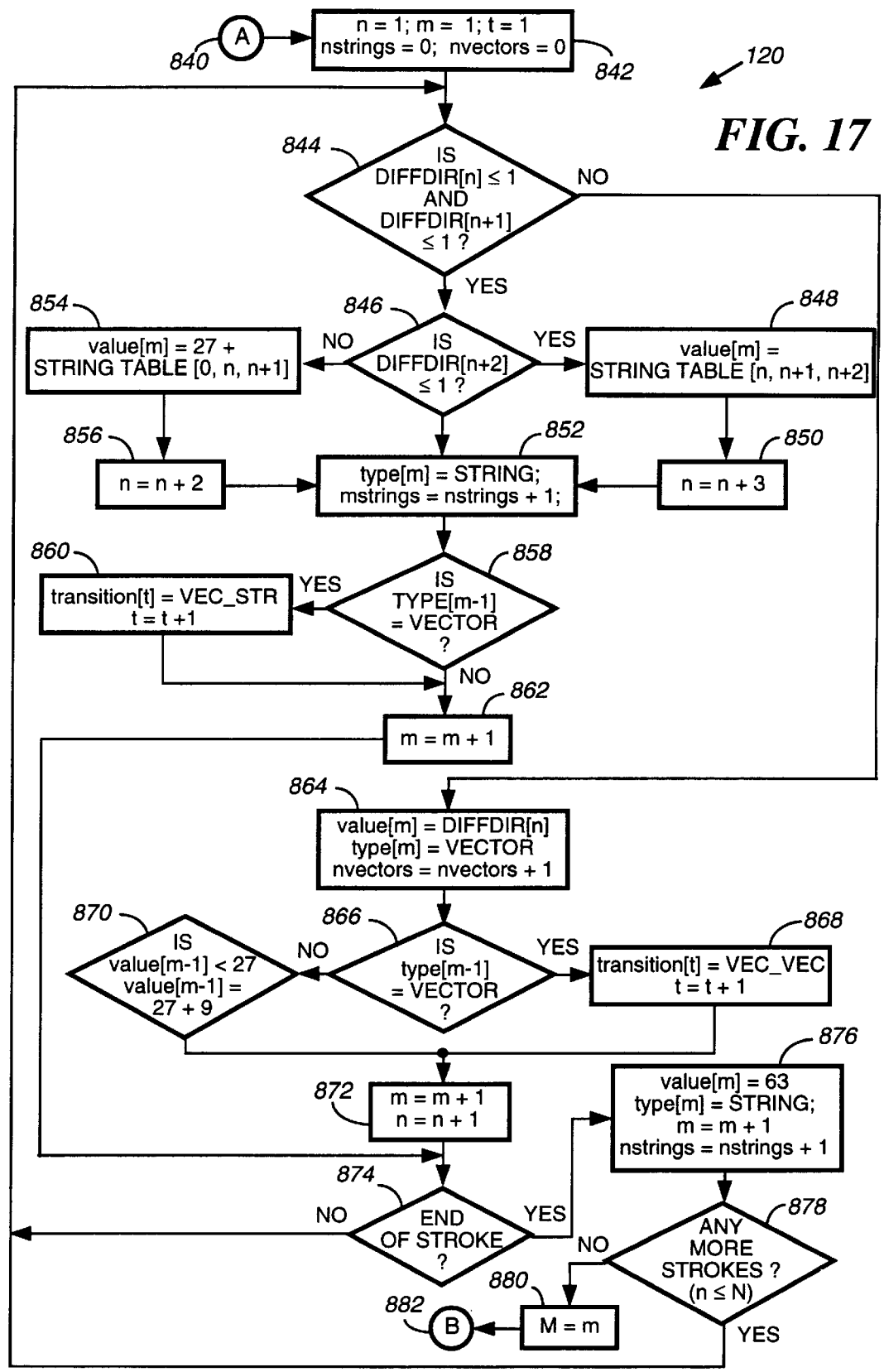
FIG. 17 is the second part of the flow chart of FIG. 16.
Figure 18:
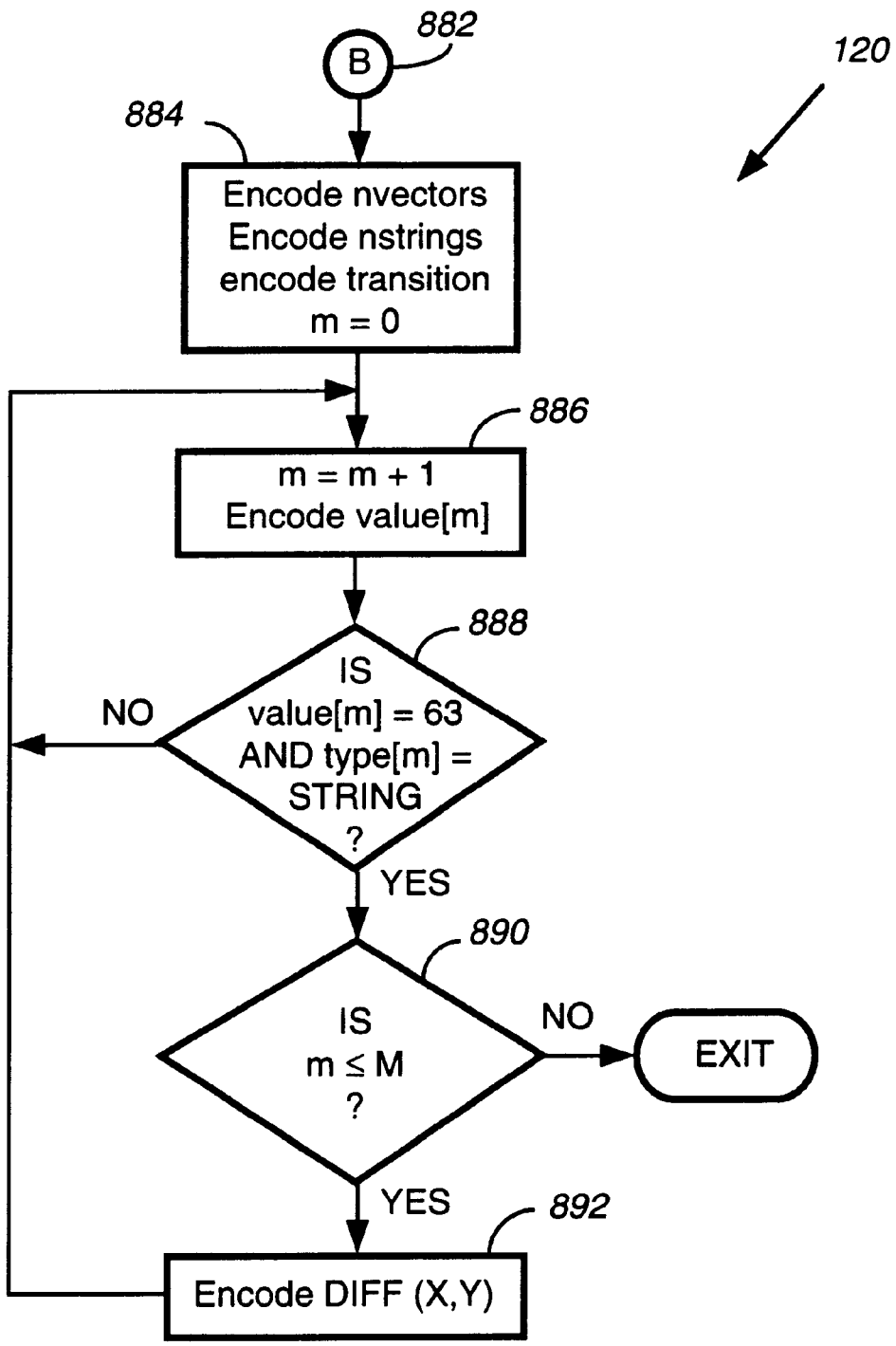
FIG. 18 is the third part of the flow chart of FIG. 17.

To further appreciate this aspect of the invention, reference is made to FIGS. 16–18, which make up a flow chart illustrating the encoding of (x, y) point pairs of strokes subroutine of step 120, of FIG. 12 herein. In FIG. 16, the encoding of (x, y) point pairs of strokes has begun. Initially, step 802, it is determined if the first region or word is the word or region being encoded. If the answer is "yes," then the number of words and ring size are encoded, step 804, before proceeding with encoding of the region width and height, step 806. Alternatively, if the region is not set equal to 1, the region width and height is also encoded, by directly going to step 806.

At step 806, the width of the word in pixels, as well as the height, is encoded for each region. Thereafter, "n", which refers to the number of directional vectors, is set at a value of 1. The previous direction, PREVDIR, is also set equal to 0. This is an initialization step. Thereafter, for each of the strokes, the previous (x, y) coordinate, prev (x, y), is initially set to be the first (x, y) pen point, which is the same as the initial pen-down location, step 810. Thereafter, this is repeated for each remaining (x, y) pen points of the stroke, step 812.

An inquiry is then made if there are more (x, y) points for this stroke, and if the answer is "no," the subroutine proceeds to inquire whether there are any more strokes for the region, step 830.

If there are any more strokes for the region, the difference (x, y), DIFF (x, y), from the last stroke endpoint to the next point starting point is computed, step 836. The program then returns back to step 810.

Alternatively, if in step 814 it is determined there are more (x, y) points for the stroke, the current (x, y) point, "this (x, y)", is set equal to the next pen stroke (x, y), "next pen (x, y)", step 816. Thereafter, the first (x, y) point is subtracted from the second (x, y) point, to give the size of the vector, and if the size of the vector is not equal to the ring size, step 818, the program returns back to step 814. Alternatively, if in step 818 it is determined the size of the vector is equal to the ring size, the directional vector is computed at step 820, by setting the pen direction, PENDIR, equal to a value in a ring table based on the difference between the current and the previous (x, y) position, "[this (x, y)—prev (x, y)]". The look up table known as the "ring table" can be established and stored in a conventional manner as will be readily apparent to those of ordinary skill in the art.

The difference in direction, DIFFDIR[n], for each step at each ring size is set equal to the pen direction, PENDIR, minus the previous direction, PREVDIR (at the beginning of encoding the previous direction, PREVDIR, is set equal to 0), step 822. Thereafter, if the difference in direction, DIFFDIR[n], is less than minus 1, step 824, the difference in direction, DIFFDIR[n], is set equal to the difference in direction, DIFFDIR[n], plus 8 times the ring size, step 826. If the difference in direction, DIFFDIR[n], is not less than minus 1, then the previous direction, PREVDIR, is set equal to the pen direction, PENDIR. The previous (x, y), prev (x, y), is set equal to the current (x, y), "this (x, y)". The value n is set equal to n+1, step 828. Thereafter, the subroutine returns to step 814.

At step 830, if it is determined that there are no more strokes for the region, then the total number of steps "N" is set equal to the total number "n" of differences in directions, and the program proceeds at step 840 to the rest of the subroutine, as further shown in FIG. 17. At step 842, the values "n", "m", and "t", indicative, in order, of difference in direction, type of value, e.g., vector or absolute, and transition indicator, are initialized at a value of 1. The total number of strings, "nstrings", is set equal to 0, and the total number of vectors, "nvectors", is set equal to 0. Thereafter, it is initially determined if the difference in direction, DIFFDIR[n], is less than or equals 1, and if the difference in direction, DIFFDIR[n+1] is less than or equals 1, step 844. If the answer to both inquiries is "no," the subroutine proceeds to step 864, where "value (m)" is set equal to the difference in direction, DIFFDIR[n], "type (m)" is set equal to a vector, and the value of the total number of vectors, "nvectors", is set equal to "nvectors+1". More specifically, in this step, the value of the difference in direction is stored, and the absolute value stored is defined as a vector. Thereafter, it is determined if "type (m−1)" is a vector, step 866, and if the answer is "yes", the total number of vectors is increased by 1, step 868. If the answer is "no," if the previous code did not indicate a vector, then the value of the prior code is looked at. If it is less than 27, it is set to a value of 27 plus 9 to indicate that the following code is a vector, step 870. The significance of these numbers was previously described herein. Thereafter, the values for the difference in direction and type are increased by 1, step 872, and the program proceeds to step 874.

Returning to the subroutine at step 844, if the answer was "yes," a further inquiry is made to determine if DIFFDIR [n+2] is less than or equal to 1, step 846. If the answer is "yes," then "value [m]" is set equal to a value obtained from a string table based on the values of "n", "n+1" and "n+2", step 848. Such a string table, like the ring table, is conventional and can be readily established by those of ordinary skill in the art. The difference in direction "n" is then set at a value of "n" plus 3, step 850.

If the inquiry at step 846 results in a "no" answer, then "value [m]" is set equal to 27, plus the value from the string table corresponding to values of "n" equal to "0", "n", and "n+1", step 854. At step 856, "n" is set to a value of "n+2". At step 852, it is determined that "type [m]" is a string and the total number of strings, "nstrings", is increased by 1. At steps 858, 860, and 862, it is determined if the previous code was a vector. If so, then a transition is set to cause a new string, step 860. If the previous code was not a vector, then no transition is set, and the next code word "m" is set at a value of "m+1", step 862.

The program then proceeds to step 874 where the inquiry is made as to whether this is the end of the stroke. If the answer is "no," the subroutine returns to step 844. If the answer is "yes," the subroutine proceeds to step 876, in which the end of the stroke is indicated by setting the value "[m]" equal to 63, as was previously described. The remainder of step 876 is self explanatory from a reading thereof. Thereafter, it is determined if there are any more strokes, step 878, and if the answer is "yes," the subroutine returns to step 844, but if the answer is "no," the program proceeds to step 880, where the number of code words "M" is set at a value equal to "m", and the subroutine proceeds to step 882, which continues in FIG. 18.

At step 884, the total number of vectors, strings, and a transition array is stored for sending. The transition array is, for example, an array indicating that a first value is a vector, a second value is a vector, a third value is a string, etc. At step 886, the value "m" is set equal to "m+1", keeping in mind that it was initially set at 0 in step 884. At step 888, the subroutine checks for the end of the string, and if it is determined that the end of the string has been reached, it is determined if the value "m" is less than or equal to "M", step 890. If the answer is "no," the subroutine exits, but if the answer is "yes," the value of DIFF (x, y) is encoded, and the subroutine returns to step 886.

At step 888, if it was determined that the end of the string had not been reached, then the subroutine returns to step 886, until such time as it is determined that the end of the string has been reached to exit the subroutine to then allow transmission of the encoded information.

Having thus described the invention, the same will become better understood from the appended claims in which it is more broadly defined in a non-limiting manner.

What is claimed is:

1. In a selective call communication system, a method for facsimile communication, comprising the steps of:
   (a) retrieving handwritten information from a source document;
   (b) encoding and compressing the handwritten information;
   (c) transferring the handwritten information to a selective call terminal;
   (d) receiving the handwritten information at the selective call terminal;
   (e) processing the handwritten information in the selective call terminal, the step of processing comprising the steps of:
      (i) thinning each line of the handwritten information;
      (ii) identifying and extracting nodes, edges and segments from the thinned image of the handwritten information to form a graphical model illustrating their layout, each node defined as a pixel with three or more neighboring pixels, each edge defined as a pixel with only one neighboring pixel, and each segment defined as an array of consecutive pixels, and said graphical model being formed by defining segments as strokes connected to nodes or edges;
      (iii) reducing said graphical model by removing segments shorter than a predefined length, and by combining at least two nodes located closer to each other than a predefined distance to form a single node, to thereby form a simplified graphical model;
      (iv) further reducing said simplified graphical model by preprocessing to temporarily remove leaves, loops, and zig-zags, wherein a leaf is a segment between a node and an edge, a loop is a segment originating and terminating at the same node, and a zig-zag is a combination of two segments originating at the same node and terminating at the same, but a different node from origination, and connecting the remaining segments to result in a further reduced simplified graphical model;
   (f) string coding the line segments of the further reduced simplified graphical model; and
   (g) transmitting the further reduced simplified graphical model to at least one selective call receiver capable of receiving facsimile information.

2. The method according to claim 1 wherein said string coding is conducted by coding the line segment (x, y) coordinates as a chain of incremental direction vectors.

3. The method according to claim 1 further comprising tracing segments from node to node to determine the longest string of segments, and as said tracing is conducted, invalidating each segment traced after tracing thereof.

4. The method according to claim 3 further comprising tracing each path of segments from a node independently, and extracting and recording each string of segments traced as a stroke.

5. The method according to claim 4 further comprising joining any two strokes which share a terminating node into a stroke.

6. The method according to claim 5 further comprising joining the leaves, loops and zig-zags temporarily removed to strokes with which a common node is shared, and forming strokes out of temporarily removed leaves, loops and zig-zags which do not share a common node with any of the defined strokes.

7. The method according to claim 1 wherein said thinning is conducted in a manner to result in an image which is one pixel wide.

8. The method according to claim 2 wherein each vector which does not deviate in directions from other vectors successive therewith by increments greater than +1, 0 and −1, is coded as one of three relative vectors (+, 0, −), and if not falling within one of said relative vectors, is coded as an absolute vector.

9. The method according to claim 8 further comprising grouping any sequence of relative vectors into sets of three called a string.

10. A selective call communication system, comprising:
(a.) a scanner for retrieving information from a source document, the source document including at least one region of interest containing handwritten information, the scanner further comprising:
a fax encoder for encoding and compressing the information; and
a modem, coupled to the encoder, for transferring the information to a selective call terminal, the selective call terminal comprising:
a receiver; and
a processor, coupled to the receiver, for processing the information, the processor further comprising:
(i) a first encoder for encoding the handwritten information as a thinned line of information;
(ii) a second encoder for encoding and compressing the thinned encoded handwritten information according to a first encoding and compression scheme wherein nodes, edges and segments are identified and extracted from the thinned encoded information to result in encoded information representative of a graphical model, a node being defined as a pixel with three or more neighboring pixels, an edge being defined as a pixel with only one neighboring pixel, a segment being defined as an array of consecutive pixels, and the graphical model being encoded by defining segments as strokes connected to nodes or edges;
(iii) a third encoder for encoding and compressing the graphical model into a simplified graphical model by removing segments shorter than a predefined length, and by combining at least two nodes located closer to each other than a predefined distance to form a single node;
(iv) a fourth encoder for further compressing and encoding the simplified graphical model by temporarily removing leaves, loops and zig-zags, wherein a leaf is defined as a segment between a node and an edge, a loop is a defined segment originating and terminating at the same node, and a zig-zag is defined as a combination of two segments originating at the same node and terminating at the same, but a different node from origination, and for connecting the remaining segments to result in a further reduced graphical model; and
(v) a fifth encoder for compressing and encoding the information representative of the further reduced graphical model into a string encoded set of line segments, thereby producing processed information; and
(b.) a transmitter, coupled to the scanner, for transmitting the processed information to at least one selective call receiver.

11. The selective call communication system according to claim 10 wherein said fifth encoder is for coding the line segment (x, y) coordinates as a chain of incremental vectors.

12. The selective call communication system according to claim 10 wherein said fourth encoder is for further compressing and encoding the information by connecting the remaining simplified graphical model by tracing segments from node to node to determine the longest string of segments, and invalidating each segment traced after it is traced.

13. The selective call communication system according to claim 12 wherein said fourth encoder is for further encoding and compressing the information by tracing each path of segments from a node independently, and extracting and recording each string of segments traced as a stroke.

14. The selective call communication system according to claim 13 wherein said fourth encoder is for further encoding and compressing the information by joining any two strokes which share a terminating node into a stroke.

15. The selective call communication system according to claim 14 wherein said fourth encoder is for further encoding and compressing the information by joining the leaves, loops and zig-zags, which have been temporarily removed, to strokes with which a common node is shared, and for forming strokes out of temporarily removed leaves, loops and zig-zags which do not share a common node with any of the defined encoded strokes.

16. The selective call communication system according to claim 10 wherein said first encoder is for encoding said thinned image as an image which is one pixel wide.

17. The selective call communication system according to claim 11 wherein said fifth encoder is for compressing and encoding said information by encoding each vector which does not deviate in direction from other vectors successive therewith by increments greater than +1, 0 and −1, as one of three relative vectors (+, 0, −), and if not falling within one of said relative vectors, for encoding the vector as an absolute vector.

18. The selective call communication system according to claim 17 wherein said fifth encoder is for encoding any sequence of relative vectors into sets of three called a string.

19. In a selective call communication system, a method for processing handwritten information in a selective call terminal, the method comprising the steps of:
(a) thinning each line of the handwritten information;
(b) identifying and extracting nodes, edges and segments from the thinned image of the handwritten information to form a graphical model illustrating their layout, each node defined as a pixel with three or more neighboring pixels, each edge defined as a pixel with only one neighboring pixel, and each segment defined as an array of consecutive pixels, and said graphical model being formed by defining segments as strokes connected to nodes or edges;
(c) reducing said graphical model by removing segments shorter than a predefined length, and by combining at least two nodes located closer to each other than a predefined distance to form a single node, to thereby form a simplified graphical model;
(d) further reducing said simplified graphical model by preprocessing to temporarily remove leaves, loops, and zig-zags, wherein a leaf is a segment between a node and an edge, a loop is a segment originating and terminating at the same node, and a zig-zag is a combination of two segments originating at the same node and terminating at the same, but a different node from origination, and connecting the remaining segments to result in a further reduced simplified graphical model;
(e) transmitting the further reduced simplified graphical model to at least one selective call receiver capable of receiving facsimile information; and
(f) string coding the line segments of the further reduced simplified graphical model prior to transmission.

20. The method according to claim 19 wherein said string coding is conducted by coding the line segment (x, y) coordinates as a chain of incremental direction vectors.

21. The method according to claim 20 wherein each vector which does not deviate in directions from other vectors successive therewith by increments greater than +1, 0 and −1, is coded as one of three relative vectors (+, 0, −), and if not falling within one of said relative vectors, is coded as an absolute vector.

22. In a selective call communication system, a method for processing handwritten information in a selective call terminal, the method comprising the steps of:

(a) thinning each line of the handwritten information, wherein said thinning is conducted in a manner to result in an image which is one pixel wide;

(b) identifying and extracting nodes, edges and segments from the thinned image of the handwritten information to form a graphical model illustrating their layout, each node defined as a pixel with three or more neighboring pixels, each edge defined as a pixel with only one neighboring pixel, and each segment defined as an array of consecutive pixels, and said graphical model being formed by defining segments as strokes connected to nodes or edges;

(c) reducing said graphical model by removing segments shorter than a predefined length, and by combining at least two nodes located closer to each other than a predefined distance to form a single node, to thereby form a simplified graphical model; and (d) further reducing said simplified graphical model by preprocessing to temporarily remove leaves, loops, and zig-zags, wherein a leaf is a segment between a node and an edge, a loop is a segment originating and terminating at the same node, and a zig-zag is a combination of two segments originating at the same node and terminating at the same, but a different node from origination, and connecting the remaining segments to result in a further reduced simplified graphical model.

23. In a selective call communication system, a scanner for retrieving information from a source document, the source document including at least one region of interest containing handwritten information, the scanner comprising:

(a) a fax encoder for encoding and compressing the information; and (b) a modem, coupled to the encoder, for transferring the information to a selective call terminal, the selective call terminal comprising:

(i) a receiver;

(ii) a processor, coupled to the receiver, for processing the information, the processor comprising:

a first encoder for encoding the handwritten information as a thinned line of information;

a second encoder for encoding and compressing the thinned encoded handwritten information according to a first encoding and compression scheme wherein nodes, edges and segments are identified and extracted from the thinned encoded information to result in encoded information representative of a graphical model, a node being defined as a pixel with three or more neighboring pixels, an edge being defined as a pixel with only one neighboring pixel, a segment being defined as an array of consecutive pixels, and the graphical model being encoded by defining segments as strokes connected to nodes or edges;

a third encoder for encoding and compressing the graphical model into a simplified graphical model by removing segments shorter than a predefined length, and by combining at least two nodes located closer to each other than a predefined distance to form a single node;

a fourth encoder for further compressing and encoding the simplified graphical model by temporarily removing leaves, loops and zig-zags, wherein a leaf is defined as a segment between a node and an edge, a loop is a defined segment originating and terminating at the same node, and a zig-zag is defined as a combination of two segments originating at the same node and terminating at the same, but a different node from origination, and for connecting the remaining segments to result in a further reduced graphical model; and (iii) a transmitter, coupled to the processor, for transmitting the processed information to at least one selective call receiver.

24. The selective call communication system according to claim 23 wherein said fourth encoder is for further compressing and encoding the information by connecting the remaining simplified graphical model by tracing segments from node to node to determine the longest string of segments, and invalidating each segment traced after it is traced.

25. The selective call communication system according to claim 24 wherein said fourth encoder is for further encoding and compressing the information by tracing each path of segments from a node independently, and extracting and recording each string of segments traced as a stroke.

26. The selective call communication system according to claim 25 wherein said fourth encoder is for further encoding and compressing the information by joining any two strokes which share a terminating node into a stroke.

27. The selective call communication system according to claim 23 wherein said first encoder is for encoding said thinned image as an image which is one pixel wide.

* * * * *